US005675817A

United States Patent [19]

Moughanni et al.

[11] Patent Number: 5,675,817

[45] Date of Patent: Oct. 7, 1997

[54] LANGUAGE TRANSLATING PAGER AND METHOD THEREFOR

[75] Inventors: Claude Moughanni; Yui Kaye Ho, both of Austin, Tex.

[73] Assignee: Motorola, Inc., Schaumburg, Ill.

[21] Appl. No.: 349,282

[22] Filed: Dec. 5, 1994

[51] Int. Cl.$^6$ ........................ G06F 15/00

[52] U.S. Cl. ........................ 395/753

[58] Field of Search ........................ 364/419.03; 395/753, 395/752, 754, 759, 798

[56] References Cited

U.S. PATENT DOCUMENTS

| | | | |
|---|---|---|---|
| 4,870,402 | 9/1989 | DeLuca et al. | 340/825.44 |
| 5,257,187 | 10/1993 | Suzuki et al. | 364/419.2 |
| 5,587,902 | 12/1996 | Kugimiya | 395/752 |

FOREIGN PATENT DOCUMENTS

| | | |
|---|---|---|
| 2197103 | 5/1988 | United Kingdom . |
| 90/16052 | 12/1990 | WIPO . |
| WO90/16052 | 12/1990 | WIPO . |

OTHER PUBLICATIONS

Seiko Instruments, Inc., "Paging Decoder IC (POCSAG) S-7038AF", pp. 1–38, 1980.

National Standard, "Code of Chinese Graphic Character Set for Information Interchange Primary Set," GB 2312–80, pp. 1–33, May 1981.

H. Chilinski, et al., IBM Technical Disclosure Bulletin, vol. 15, No. 5, Oct. 1972, Address Comparision, pp. 1632–1633.

T.J. Perry, IBM Technical Disclosure Bulletin, vol. 15, No. 9, Feb. 1973, Dynamic Debugging, p. 2953.

R. J. Bullions III, et al., IBM Technical Disclosure Bulletin, vol. 20, No. 9, Feb. 1978, Dynamic Enabling/Disabling of Program Event Recording Range Compare, pp. 3608–3609.

*Primary Examiner*—Phu K. Nguyen

*Attorney, Agent, or Firm*—Bruce E. Hayden; Elizabeth A. Apperley

[57] ABSTRACT

A data processing system (20) allows a user of a pager to receive an electronic message in a language of their own choice rather than the language of a message sender. During operation, the data processing system is enabled to receive (12) an incoming message and, subsequently, detect a language of the incoming message. If the language is different than a default language of the user, the message is translated to a default language of the user (34). The message is then be displayed (40) on a screen of a paging device in the language preselected by the user or provided via a voice synthesizer (50) for an audio message. The choice of use of a visual display or use of the voice synthesizer is preselected by the user.

22 Claims, 6 Drawing Sheets

| BITS B7 | | | | | | | 0 | 0 | 0 | 0 | 1 | 1 | 1 | 1 |
|---|---|---|---|---|---|---|---|---|---|---|---|---|---|---|
| B6 | | | | | | | 0 | 0 | 1 | 1 | 0 | 0 | 1 | 1 |
| B5 | | | | | | | 0 | 1 | 0 | 1 | 0 | 1 | 0 | 1 |
| | B4 | B3 | B2 | B1 | ROW \ COLUMN | | 0 | 1 | 2 | 3 | 4 | 5 | 6 | 7 |
| | 0 | 0 | 0 | 0 | 0 | | NUL | DLE | SP | 0 | @ | P | ' | p |
| | 0 | 0 | 0 | 1 | 1 | | SOH | DC1 | ! | 1 | A | Q | a | q |
| | 0 | 0 | 1 | 0 | 2 | | STX | DC2 | " | 2 | B | R | b | r |
| | 0 | 0 | 1 | 1 | 3 | | ETX | DC3 | # | 3 | C | S | c | s |
| | 0 | 1 | 0 | 0 | 4 | | EOT | DC4 | $ | 4 | D | T | d | t |
| | 0 | 1 | 0 | 1 | 5 | | ENQ | NAK | % | 5 | E | U | e | u |
| | 0 | 1 | 1 | 0 | 6 | | ACK | SYN | & | 6 | F | V | f | v |
| | 0 | 1 | 1 | 1 | 7 | | BEL | ETB | ' | 7 | G | W | g | w |
| | 1 | 0 | 0 | 0 | 8 | | BS | CAN | ( | 8 | H | X | h | x |
| | 1 | 0 | 0 | 1 | 9 | | HT | EM | ) | 9 | I | Y | i | y |
| | 1 | 0 | 1 | 0 | 10 | | NL | SUB | * | : | J | Z | j | z |
| | 1 | 0 | 1 | 1 | 11 | | VT | ESC | + | ; | K | [ | k | { |
| | 1 | 1 | 0 | 0 | 12 | | FF | FS | , | < | L | \ | l | \| |
| | 1 | 1 | 0 | 1 | 13 | | CR | GS | – | = | M | ] | m | } |
| | 1 | 1 | 1 | 0 | 14 | | SO | RS | . | > | N | ^ | n | ~ |
| | 1 | 1 | 1 | 1 | 15 | | SI | US | / | ? | O | — | o | DEL |

| | | |
|---|---|---|
| | 4021[ ] | 4022[ ] |
| 4023[ ] | 4024[ ] | 4025[ ] |
| 4026[ ] | 4027[ ] | 4028[ ] |
| 4029[ ] | 402A[ ] | 402B[ ] |
| 402C[ ] | 402D[ ] | 402E[ ] |
| 402F[ ] | 4030[ ] | 4031[ ] |
| 4032[ ] | 4033[ ] | 4034[ ] |
| 4035[ ] | 4036[ ] | 4037[ ] |
| 4038[ ] | 4039[ ] | 403A[ ] |
| 403B[ ] | 403C[ ] | 403D[ ] |
| 403E[ ] | 403F[ ] | 4040[ ] |
| 4041[ ] | 4042[ ] | 4043[ ] |
| 4044[ ] | 4045[ ] | 4046[ ] |
| 4047[ ] | 4048[ ] | 4049[ ] |
| 404A[ ] | 404B[ ] | 404C[ ] |
| 404D[ ] | 404E[ ] | 404F[ ] |
| 4050[ ] | 4051[ ] | 4052[ ] |
| 4053[ ] | 4054[ ] | 4055[ ] |
| 4056[ ] | 4057[ ] | 4058[ ] |
| 4059[ ] | 405A[ ] | 405B[ ] |
| 405C[ ] | 405D[ ] | 405E[ ] |
| 405F[ ] | 4060[ ] | 4061[ ] |
| 4062[ ] | 4063[ ] | 4064[ ] |
| 4065[ ] | 4066[ ] | 4067[ ] |
| 4068[ ] | 4069[ ] | 406A[ ] |
| 406B[ ] | 406C[ ] | 406D[ ] |
| 406E[ ] | 406F[ ] | 4070[ ] |
| 4071[ ] | 4072[ ] | 4073[ ] |
| 4074[ ] | 4075[ ] | 4076[ ] |
| 4077[ ] | 4078[ ] | 4079[ ] |
| 407A[ ] | 407B[ ] | 407C[ ] |
| 407D[ ] | 407E[ ] | 4121[ ] |
| 4122[ ] | 4123[ ] | 4124[ ] |
| 4125[ ] | 4126[ ] | 4127[ ] |
| 4128[ ] | 4129[ ] | 412A[ ] |
| 412B[ ] | 412C[ ] | 412D[ ] |
| 412E[ ] | 412F[ ] | 4130[ ] |
| 4131[ ] | 4132[ ] | 4133[ ] |
| 4134[ ] | 4135[ ] | 4136[ ] |
| 4137[ ] | 4138[ ] | 4139[ ] |
| 413A[ ] | 413B[ ] | 413C[ ] |

FIG. 8

LANGUAGE TRANSLATING PAGER AND METHOD THEREFOR

CROSS-REFERENCE TO A RELATED APPLICATION

This application is related to our commonly assigned copending patent entitled: "Pager For Wireless Control and Method Therefor" by Claude Moughanni and Yui Kaye Ho, U.S. Pat. No. 5,608,655, issued Mar. 4, 1997.

FIELD OF THE INVENTION

This invention relates generally to a data processor for processing a paging input message, and more particularly to a data processor for translating a language of the paging input message.

BACKGROUND OF THE INVENTION

Pagers and paging systems are widespread and rampantly used in our increasingly mobile society. Pagers are generally used to enable families, friends, and co-workers to be readily accessible to one another; Access is only a telephone call away. As technology has grown, pagers have evolved from providing only telephone numbers to providing much more complex alphanumeric messages and are even capable of accessing services which provide stock market reports and the like.

Generally, pagers provide messages and access services in a preselected language. For pager users which have international contacts or wish to access services from other countries, the foreign user must first have a pager which receives messages in a format which corresponds to a format of the communication device which transmits the paging message. Subsequently, the message received by the foreign user must then be interpreted and translated into the language of the foreign user. While translation devices do exist, such devices are often time consuming and detract from the convenience of a pager. U.S. Pat. No. 5,257,187 provides an example of a translation device. In U.S. Pat. No. 5,257,187, a user must input a message and the device then performs a translation function determined by the user.

To gain access to critical international paging messages, a user must have both a pager for receiving the message and a translation device to provide the message in a format which the user may readily understand. Additionally, the user must perform an intermediate step of typing the message to an input of the translation device. In all, the present method of receiving pages in a foreign language is both time consuming and inconvenient.

SUMMARY OF THE INVENTION

The previously mentioned needs are fulfilled with the present invention. Accordingly, there is provided, in a first form, a data processing system. The data processing system includes a receiver for receiving a paging input in a first format. A decoder is coupled to the receiver for receiving the paging input in the first format, the decoder providing the paging input in a second format. The data processing system also includes a data processor. The data processor includes an interface coupled to the decoder for receiving the paging input in the second format. A central processing unit is coupled to the interface for receiving the paging input in the second format. The central processing unit generates an output control signal in response to a first portion of the paging input and generating a message control signal in response to a second. A memory is coupled to the interface for receiving the paging input in the second format. The memory selectively stores the paging input. A message processing unit is connected to the interface for receiving the paging input in the second format and the central processing unit for receiving the message control signal. The message processing unit determines a first language in which the paging input is transmitted to the data processor and selectively initiating a translation program to translate the paging input to a preselected preferred language.

In a second form, the present invention provides a method for translating an input language of a paging input. The method includes the steps of receiving a paging input in a first format and detecting a language of the paging input using a message processing unit. A language translation program is accessed in a memory when the language of the paging input is one of a first set of languages. The paging input is translated to a most efficient language when the language of the paging input is one of the first set of languages. The paging input is stored in the most efficient language in the memory.

In a third form, the present invention provides a method for translating an input language of a paging input. The method includes the steps of receiving a paging input in a first format and detecting a language of the paging input using a message processing unit. A message processing unit is enabled to determine when the language of the paging input corresponds to a preferred language. A language translation program is accessed from a memory when the language of the paging input does not correspond to the preferred language. The paging input is translated to the preferred language using the message processing unit.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

FIG. 8 illustrates an international code format of Chinese characters for Peoples Republic of China (GB-2312-80).

DETAILED DESCRIPTION OF A PREFERRED EMBODIMENT

The present invention provides a data processing system which allows a user of a pager to receive an electronic message in a language of their own choice rather than the language of a message sender. During operation of the present invention, the data processing system will be enabled to receive an incoming message and, subsequently, detect a language of the incoming message. If the language is different than a default language of the user, the message will be translated to a default language of the users. The message will then be displayed on a screen of a paging device in the language chosen by the user or provided via a voice synthesizer for an audio message. The data processor and method used to perform these functions will subsequently be described in greater detail.

The present invention describes the translation of English and Chinese languages for both a video display and an audio pronouncement. It should be understood, however, that the number or group of languages may be modified to meet the needs of a consuming public.

Figure 1:
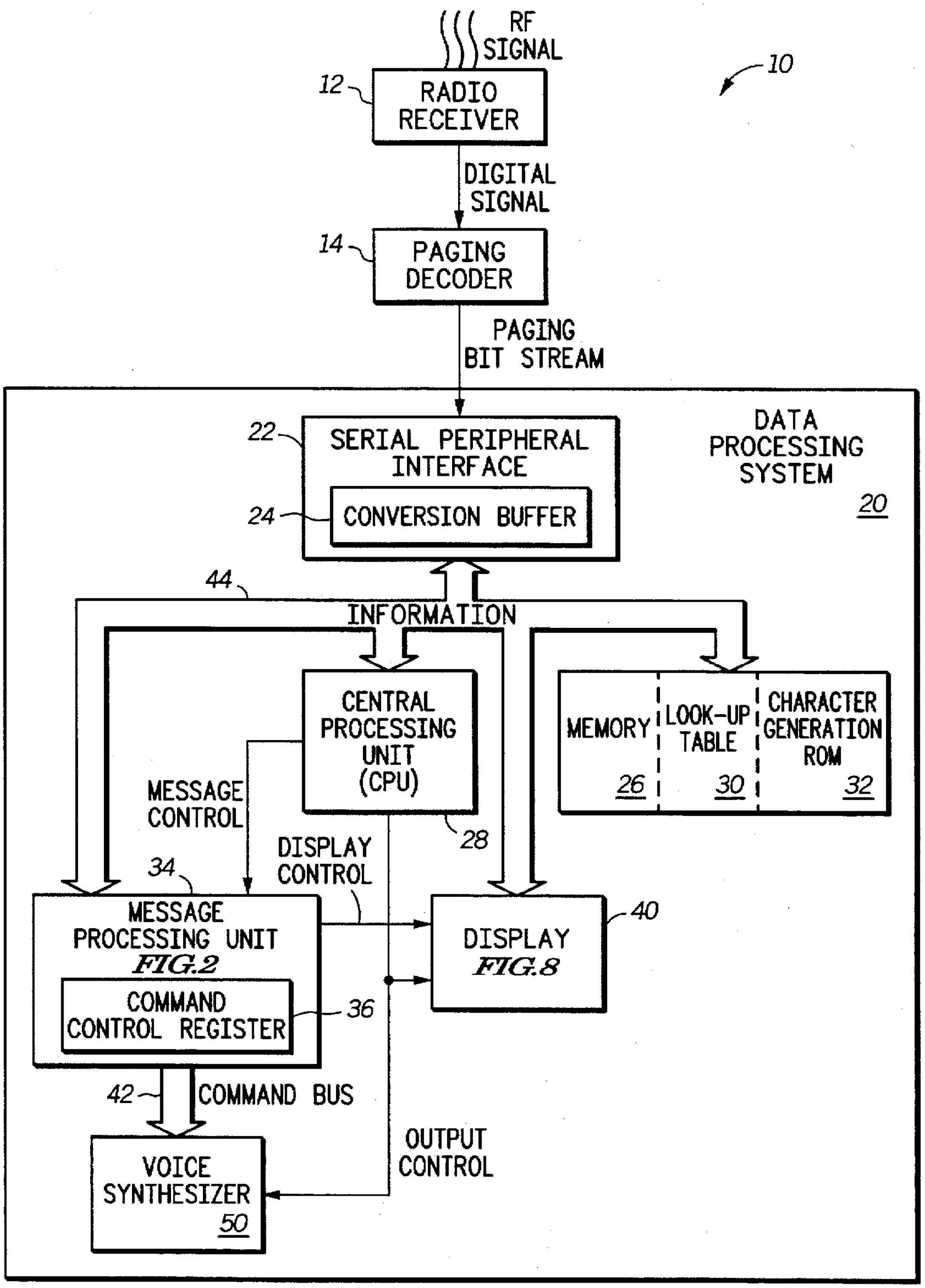
FIG. 1 illustrates in block diagram form a paging communication system in accordance with the present invention.

FIG. 1 illustrates a paging communication system 10 of the present embodiment of the invention in greater detail. Paging communication system 10 includes a radio receiver 12, a paging decoder 14, a serial peripheral interface 22 which includes a conversion buffer 24, a memory 26, a central processing unit (CPU) 28, a look-up table 30, a character generation ROM 32, a message processing unit 34, a display 40, and a voice synthesizer 50. Message processing unit 34 includes a command control register 36.

A RF signal is provided to radio receiver 12. Radio receiver 12 is coupled to paging decoder 14 to provide a Digital Signal. Paging decoder 14 provides a Paging Bit Stream signal to serial peripheral interface 22. Serial peripheral interface 22 is coupled to memory 26, CPU 28, look-up table 30, character generation ROM 32, and message processing unit 34 via an Information bus 44. CPU 28 is coupled to message processing unit 34 to provide a Message Control signal. Message processing unit 34 is coupled to display 40 to provide a Display Control signal. CPU 28 is coupled to display 40 and voice synthesizer 50 to provide an Output Control signal. Message processing unit 34 is also coupled to voice synthesizer 50 via a Command bus 42.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

General Description of Operation

During operation, the RF signal is provided to radio receiver 12. Radio receiver 12 is implemented in each electronic device which will be used in conjunction with the present invention and is provided to detect a paging signal. Transmission of paging information using RF signals is well known in the data processing art and will not be described in greater detail herein. When radio receiver 12 receives the RF signal, radio receiver 12 converts the signal to a digital bit stream referred to as the Digital signal in FIG. 1. Paging decoder converts the digital bit stream of the Digital signal to a data bit stream. The data bit stream is then transferred to serial peripheral interface 22 via the Paging Bit Stream signal.

Figure 4:
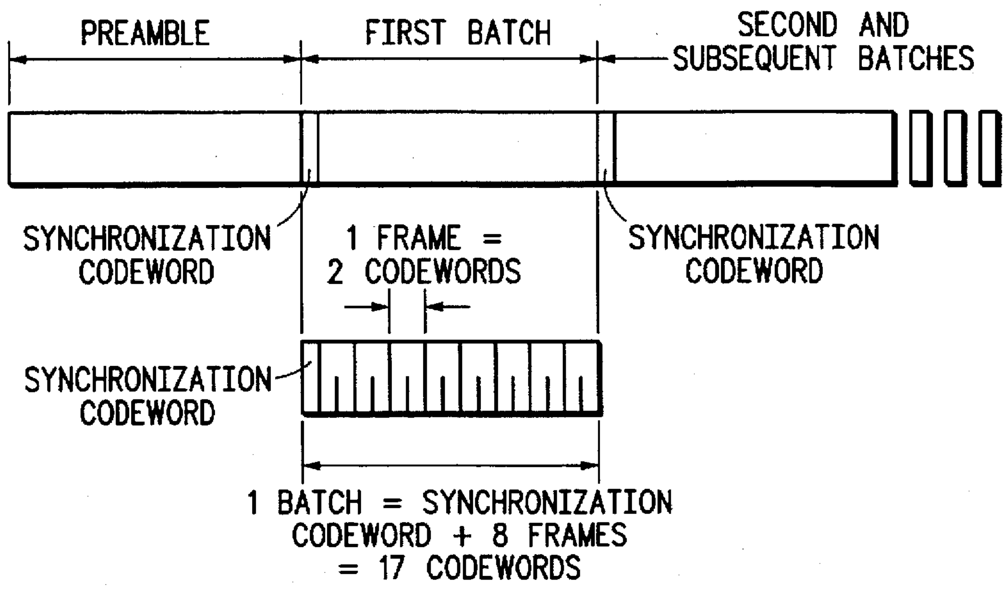
FIG. 4 illustrates a first paging synchronization and communication protocol.

In the embodiment of the invention described herein, a paging protocol such as POCSAG is used. While the POCSAG protocol is a current digital message paging standard, it should be understood that any protocol may be used in conjunction with the present invention. FIG. 4 illustrates a typical signal in a POCSAG format. In the POCSAG protocol, the transmission of data consists of a preamble followed by batches of complete codewords. The preamble of the data stream protocol is provided at a beginning of a block of data to give notice to paging decoder 14 that a POCSAG signal is being received. Paging decoder 14 may then use the preamble to synchronize to the timing of the transmitted data. Furthermore, each batch begins with a synchronization codeword and includes eight frames of information. Therefore, each batch includes seventeen codewords. During operation, data processing system 20 will only examine data in a predetermined frame identified by paging decoder 14.

Figure 5:
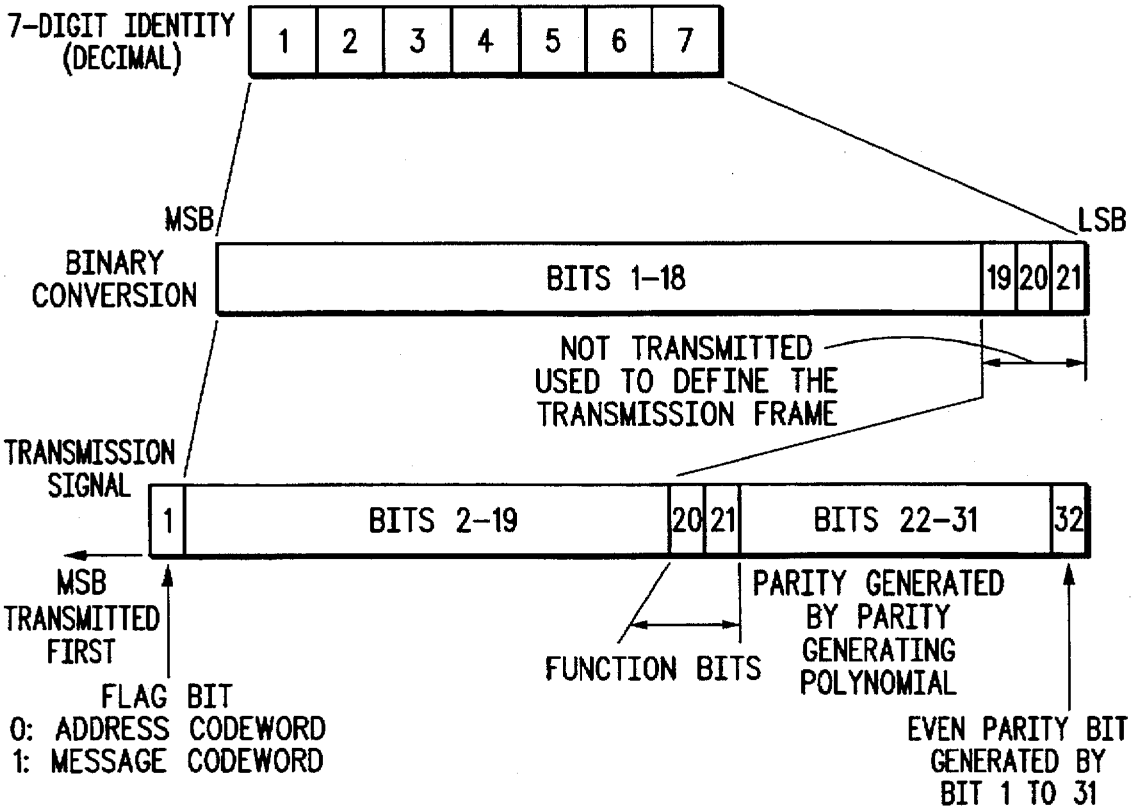
FIG. 5 illustrates a second paging synchronization and communication protocol.

Data in the POCSAG format is transmitted to paging decoder 14. Bits 1 through 18 indicate address information and bits 19 through 21 indicate a transmission frame for each frame of data in the block of transmitted information in FIG. 5. Binary address bits 1 through 18 are decoded and compared with a seven digit identity value previously programmed into paging decoder 14. FIG. 5 illustrates the seven digit decimal identity value which is programmed into paging decoder 14 and which is used to indicate a frame to be accessed. When the frame transmitted by the Digital signal corresponds to the identity value programmed into paging decoder 14, corresponding address bits are received and decoded. Included within the converted address bits is a flag bit which typically indicates if a remaining portion of the transmitted data is an address codeword or a message codeword. Address or message information as indicated by a logic value of the flag bit subsequently follows. Two function bits are then provided to indicate a message type. As with frame identification, paging decoder 14 is programmed to determine a meaning of the function bits. In one embodiment of the present embodiment, the function bits may be used to indicate a language of an incoming page signal. In a second embodiment of the present invention, the language of the incoming page signal is embedded in the data stream. Each of these embodiments will be subsequently discussed in greater detail.

After being decoded by paging decoder 14 to provide incoming information via the Paging Bit Stream signal, the incoming information is provided to serial peripheral interface 22. The incoming information is stored in conversion buffer 24 of serial peripheral interface 22. CPU 28 subsequently determines the language of the incoming information. The language may be encoded in the function bits or may be embedded in the information value itself. The preferred language can be indicated by a value stored in command control register 36 such it is programmable by an external user. CPU 28 may interpret a portion of the data bit stream or use function code bits transmitted in compliance with the POCSAG protocol to specify the language of the incoming message.

Figures 6, 7:
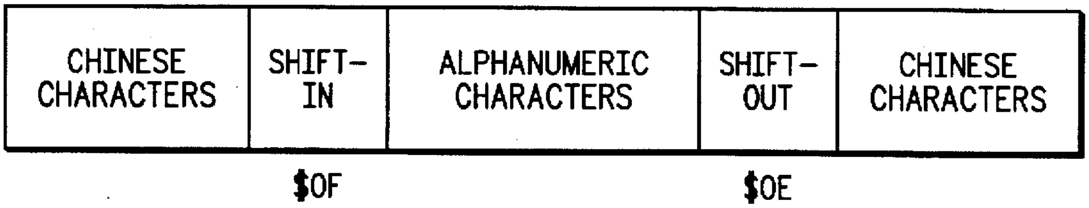
FIG. 6 illustrates a third paging synchronization and communication protocol.
FIG. 7 illustrates a character set used in an alphabet based language translation format.

Once the language of the incoming information is determined, message processing unit 34 determines if the language is the most efficient for storage in memory 26. The efficiency of the language is determined by the amount of memory space in memory 26 which is consumed by a preselected set of phrases. The most efficient language is determined by the different languages supported by data processing system 20. In this embodiment of the invention, data processing system 20 supports English and Chinese. Chinese is assumed to be a more efficient coding because each Chinese character references a word and not a single letter of the alphabet as is required in an alphabet based format. FIG. 7 illustrates a typical character set used in an alphabet based language translation format and FIG. 8 illustrates a typical encoding for Chinese characters. It should be noted that in this embodiment of the invention the encoding for Chinese characters is based on the National Standard Code of Chinese Graphic Character Set (GB 2312-80) which is published by the State Bureau of Standardization of the People's Republic of China. It should be noted that this is only an example and other standards exist for other countries. FIG. 6 illustrates a format in which a Chinese message is sent. A Chinese message is sent sequentially in a same order as it is to be read. The message is decoded by paging decoder 14 as two, seven bit characters for each Chinese character. A message mix Chinese characters with regular alphanumeric representations enclosed in Shift-In and Shift-Out characters.

Figure 2:
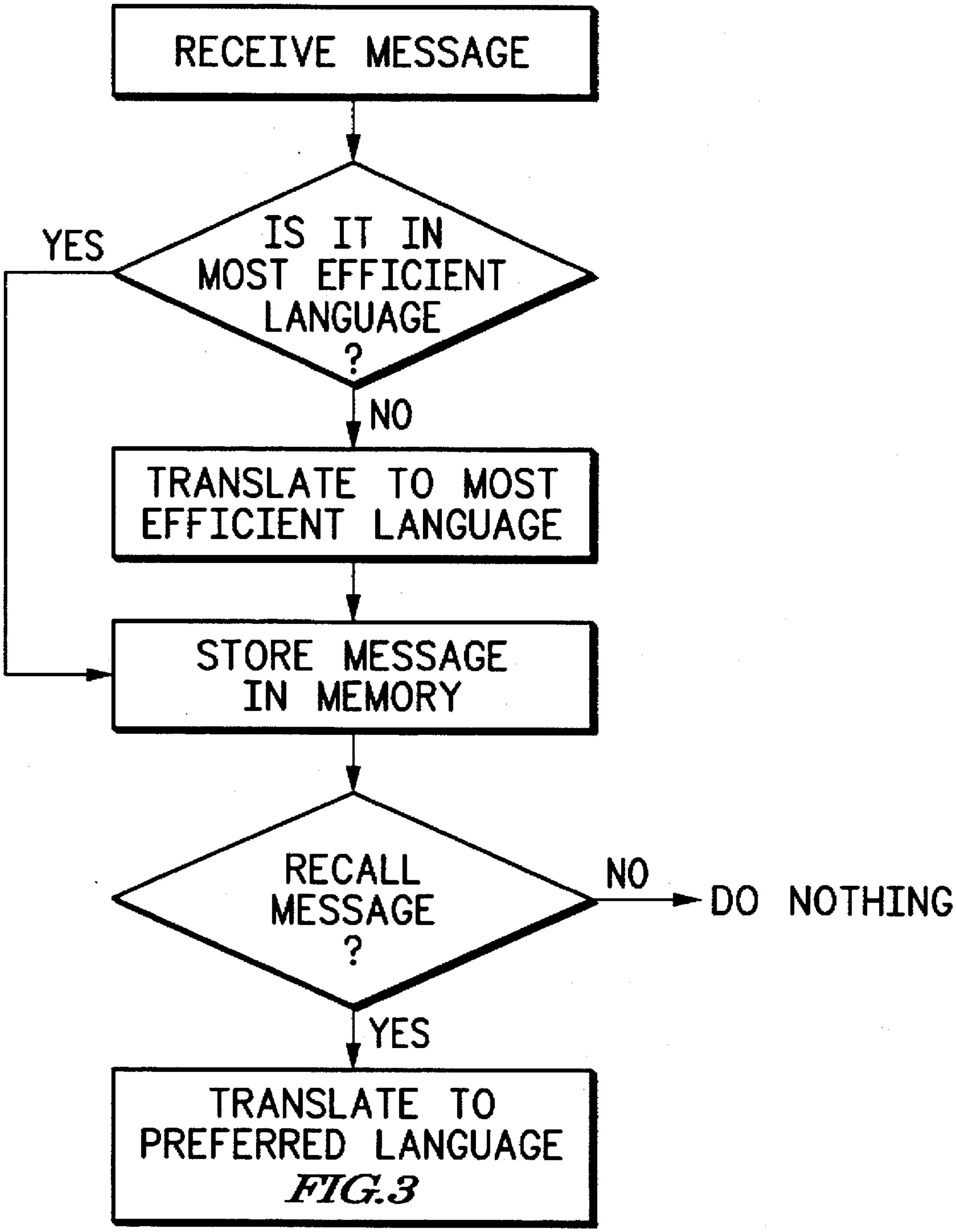
FIG. 2 illustrates in flow chart form a series of steps executed by a message processing unit of the paging communication system of FIG. 1.

If message processing unit 34 determines if the incoming information is not in the most efficient language, CPU 28 controls translation of the incoming message to the most efficient language. CPU 28 accesses a memory translation program from memory 26 to perform the translation operation. During execution of the program from memory 26, look-up table 30 is accessed to determine a translated equivalent to each word or phrase received in the incoming information. The translated information is subsequently stored in memory 26. The steps of receiving the message and storing the message in a most efficient language are summarized in the flow chart of FIG. 2.

Figure 3:
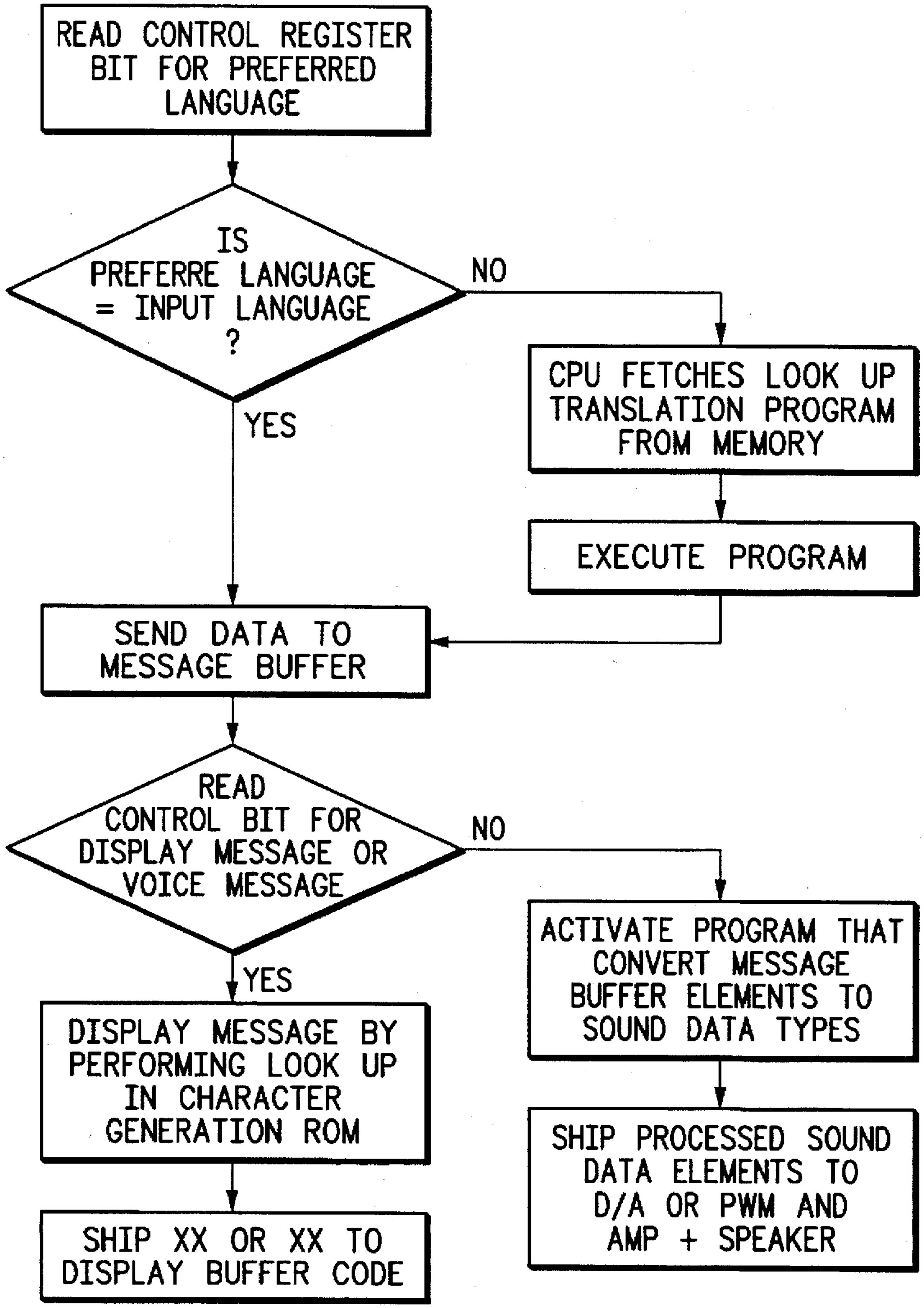
FIG. 3 illustrates in flow chart form a series of steps to translate a message to a preferred language which are executed by the message processing unit of the paging communication system of FIG. 1.

When the message is subsequently recalled by activation of Message Control signal to message processing unit 34, data processing system 20 executes the steps of the flow chart illustrated in FIG. 3. It should also be noted that the message may be recalled by an external user asserting a mechanical switch as is done with most pagers. When the mechanical switch is asserted, CPU 28 is interrupted and CPU 28 executes a service routine stored in memory 26. The service routine subsequently enables message processing unit 34 to recall an appropriate message from memory 26. When the message is recalled, CPU 28 accesses command control register 36 to determine a preferred language for providing the message to the user. Command control register 36 stores a preprogrammed data value which indicates which language is the user's preferred language. In this embodiment of the invention, the user may choose either English and Chinese as their preferred language.

If the message is in the user's preferred language, the message is stored in a message buffer (not shown herein) of message processing unit 34. If the message is not in the user's preferred language, the CPU 28 fetches the translation look-up program from memory 26. The translation look-up program is subsequently executed using look-up table 30. Look-up table 30 provides word equivalence between different languages. When the translation look-up program has completed the translation operation from the input language to the preferred language, the translated message is provided to the message buffer (not shown herein) of message processing unit 34.

At this point, CPU 28 provides the Message Control signal to indicate whether the message should be visually or auditorially displayed. A control register (not shown herein) is programmed by the external user to contain the user's preferred language. The control register 36 is also programmed by the user to indicate if the message should be visually displayed, auditorially displayed, or both. The control register may reside in memory 26, CPU 28, message processing unit 34, or other circuits as deemed appropriate by a system designer. If the Message Control signal indicates that the message should be visually displayed, message processing unit asserts the Display Control signal and provides it to display 40. CPU 28 then provides the Output Control signal to display 40. Message processing unit 34 provides the translated message to display 40. In providing the translated message to display 40, message processing unit 34 accesses character generation ROM 32 for a bit pattern representation of a Chinese character which corresponds to a phrase of the translated message if the preferred language is Chinese. The bit pattern provided by character generation ROM 32 is subsequently provided to display 40 via Information bus 44. Display 40 then displays the character to a user via a liquid crystal display or some other type of output screen. If the preferred language is English, then display the message using the alphabet format illustrated in FIG. 7. The message will be retrieved from memory 26 and subsequently displayed.

If the user desires the message to be spoken rather than provided visually, message processing unit 34 accesses a program stored in memory 26 which will convert the translated message into sound data types. The language conversion is provided for both the English and Chinese languages and is well known in the data processing art. As such, it will not be discussed in further detail herein. When the translated message is converted into sound data types, the sound data types, the sound is provided to a digital to analog converter or a pulse width modulator and then to an amplifier and a speaker (not shown in detail herein) included within voice synthesizer 50. When voice synthesizer 50 receives an asserted Output Control signal from CPU 28 to indicate the message should be provided, the message is provided to the user in an audio format. Therefore, the user may hear, rather than read the message.

In summary, the present invention provides a paging system which transparently translates an incoming message into a user's preferred language. The user has the ability to preset the preferred language and the ability to determine if the message will be provided visually or auditorially. Furthermore, the message will be stored in paging memory in a most efficient language for memory consumption purposes. This allows the pager to store more messages with less memory. Furthermore, the idea of message compression by storing a message in a different language may be expanded upon in the area of message transmission. If most pagers had the automatic language translation function described herein, messages could be transmitted in a language which took the least amount of bandwidth. Therefore, more messages could be concurrently transmitted and an end user would still be able to view the message in their preferred language.

The implementation of the invention described herein is provided by way of example only. However, many other implementations may exist for executing the function described herein. For example, music can also be interpreted as a language. Similarly, bit mapped images may also be used as a language. In these cases, the characters are interpreted as notes or pixel locations, gray scale or color, respectively.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system, comprising:

a receiver for receiving a paging input in a first format;

a decoder coupled to the receiver for receiving the paging input in the first format, the decoder providing the paging input in a second format;

a data processor, comprising:

an interface coupled to the decoder for receiving the paging input in the second format;

a central processing unit coupled to the interface for receiving the paging input in the second format, the central processing unit generating an output control signal in response to a first portion of the paging input and generating a message control signal in response to a second;

a memory coupled to the interface for receiving the paging input in the second format, the memory selectively storing the paging input; and a message processing unit coupled to the interface for receiving the paging input in the second format and the central processing unit for receiving the message control signal, the message processing unit determining a first language in which the paging input is transmitted to the data processor and selectively initiating a translation program to translate the paging input to a preselected preferred language.

2. The data processing system of claim 1 further comprising:

a display circuit coupled to the message processing unit to receive a display control signal, the display circuit processing the paging input in the preselected preferred language and provided a visual display to an external user.

3. The data processing system of claim 1 further comprising:

a voice synthesizer coupled to the message processing unit to receive a plurality of command signals, the plurality of command signals enabling the voice synthesizer to provide an audio message to an external user.

4. The data processing system of claim 1 wherein the memory further comprises:

a look-up table for storing a cross-reference between the first language in which the paging input is received and the preferred language.

5. The data processing system of claim 1 wherein the memory further comprises a character generation ROM for converting the paging input from the first language to a pictograph language.

6. The data processing system of claim 1 wherein the first format of the paging input is a POCSAG format.

7. The data processing system of claim 1 wherein the first format of the paging input includes a function code bit.

8. The data processing system of claim 7 wherein the message processing unit processes the function code bit to determine the first language of the paging input.

9. The data processing system of claim 1 wherein the first format of the paging input includes a language value embedded in the paging input.

10. The data processing system of claim 9 wherein the message processing unit processes the function code bit to determine the first language of the paging input.

11. The data processing system of claim 1 wherein the message processing unit determines if the first language of the paging input is in a most efficient language.

12. The data processing system of claim 11 wherein the message processing unit initiates the translation program to translate the message from the first language of the paging input to the most efficient language.

13. The data processing system of claim 12 wherein the paging input is stored in the memory in the most efficient language.

14. The data processing system of claim 1 wherein the preselected preferred language is programmed by an external user.

15. The data processing system of claim 1 further comprising a control register, the control register being programmed by an external user to indicate if the message should be visually or auditorially displayed.

16. A method for translating an input language of a paging input, comprising the steps of:

receiving a paging input in a first format;

detecting a language of the paging input using a message processing unit;

accessing a language translation program in a memory when the language of the paging input is one of a first set of languages;

translating the paging input to a most efficient language when the language of the paging input is one of the first set of languages; and storing the paging input in the most efficient language in the memory.

17. The method of claim 16 further comprising the steps of:

retrieving the paging input in the most efficient language from the memory;

enabling a message processing unit to determine when the most efficient language corresponds to a preferred language;

accessing the language translation program from the memory when the most efficient language does not correspond to the preferred language; and translating the paging input to the preferred language using the message processing unit.

18. The method of claim 16 further comprising the step of:

coupling a display circuit to the message processing unit to process the paging input in the preferred language and provide a visual display to an external user.

19. The method of claim 16 further comprising the step of:

coupling a voice synthesizer to the message processing unit, the message processing unit providing a plurality of command signals and the plurality of command signals enabling the voice synthesizer to provide an audio message to an external user.

20. The method of claim 16 wherein the language translation program accesses a look-up table which stores a cross-reference between the first language in which the paging input is received and the preferred language and the most efficient language.

21. A method for translating an input language of a paging input, comprising the steps of:

receiving a paging input in a first format;

detecting a language of the paging input using a message processing unit;

enabling a message processing unit to determine when the language of the paging input corresponds to a preferred language;

accessing a language translation program from a memory when the language of the paging input does not correspond to the preferred language; and translating the paging input to the preferred language using the message processing unit.

22. The method of claim 21 further comprising the steps of:

accessing a language translation program in a memory when the language of the paging input is one of a first set of languages;

translating the paging input to a most efficient language when the language of the paging input is one of the first set of languages; and storing the paging input in the most efficient language in the memory.

* * * * *